(12) United States Patent
Coyle

(10) Patent No.: US 8,979,047 B2
(45) Date of Patent: Mar. 17, 2015

(54) MOUNTING BRACKET FOR A WINDOW

(76) Inventor: Sean Coyle, Cookstown (GB)

( * ) Notice: Subject to any disclaimer, the term of this patent is extended or adjusted under 35 U.S.C. 154(b) by 112 days.

(21) Appl. No.: 13/319,386

(22) PCT Filed: May 10, 2010

(86) PCT No.: PCT/GB2010/050759
§ 371 (c)(1),
(2), (4) Date: Nov. 8, 2011

(87) PCT Pub. No.: WO2010/128341
PCT Pub. Date: Nov. 11, 2010

(65) Prior Publication Data
US 2012/0049022 A1 Mar. 1, 2012

(30) Foreign Application Priority Data
May 8, 2009 (GB) .................................. 0907951.8

(51) Int. Cl.
*A47B 96/06* (2006.01)
*E04D 13/03* (2006.01)

(52) U.S. Cl.
CPC .......... *E04D 13/031* (2013.01); *Y10S 248/904* (2013.01)
USPC ............ 248/220.21; 248/220.22; 248/221.11; 248/223.41; 248/904; 52/712; 40/299.01

(58) Field of Classification Search
USPC ............. 248/220.21, 220.22, 220.41, 221.11, 248/222.11, 222.12, 223.13, 222.52, 248/223.41, 223.31, 223.21, 308, 909, 904, 248/694; 42/299.01; 52/200, 712, 714; 40/299.01
See application file for complete search history.

(56) References Cited

U.S. PATENT DOCUMENTS

| | | | |
|---|---|---|---|
| 3,722,142 A * | 3/1973 | Anderberg et al. | 49/248 |
| 4,261,155 A * | 4/1981 | Gilb | 52/702 |
| 4,796,331 A * | 1/1989 | White et al. | 16/324 |
| 4,920,713 A * | 5/1990 | Borresen et al. | 52/200 |
| 4,932,173 A * | 6/1990 | Commins | 52/92.2 |
| 5,271,124 A * | 12/1993 | Sandell | 16/370 |
| 5,499,854 A * | 3/1996 | Crotty et al. | 296/97.13 |
| 5,581,942 A * | 12/1996 | Sill et al. | 49/253 |
| 5,682,713 A * | 11/1997 | Weiss | 52/200 |
| 6,629,391 B1 * | 10/2003 | Børresen et al. | 52/200 |
| 6,644,606 B1 * | 11/2003 | Seidel | 248/220.41 |
| 7,293,393 B2 * | 11/2007 | Kelly et al. | 52/665 |
| 7,516,771 B2 * | 4/2009 | Drew et al. | 160/173 R |
| 8,108,971 B2 * | 2/2012 | Florek | 16/357 |
| 8,490,330 B2 * | 7/2013 | Lund et al. | 49/141 |
| 2008/0115430 A1 * | 5/2008 | Feucht et al. | 52/200 |
| 2011/0253853 A1 * | 10/2011 | Horneck | 248/205.4 |

OTHER PUBLICATIONS

International Search Report for PCT International Patent Application PCT/GB2010/050759.
Written Opinion of the International Searching Authority for PCT International Patent Application PCT/GB2010/050759.

* cited by examiner

*Primary Examiner* — Monica Millner
(74) *Attorney, Agent, or Firm* — Preston Smirman; Smirman IP Law, PLLC

(57) ABSTRACT

A mounting bracket (1, 41, 91, 121) for a roof window has a frame mountable member (2, 2a, 93, 123), a roof mountable member (3, 3a, 94, 124) and a hinge arrangement (22, 34, 95, 125) for mechanically coupling the roof mountable member (3, 3a, 94, 124) and the frame mountable member (2, 2a, 93, 123) together so that the roof mountable member (3, 3a, 94, 124) is movable between an out of use storage position and an in use mounting position. The location of the pivotal point of the hinge arrangement (22, 34, 95, 125) is movable.

16 Claims, 12 Drawing Sheets

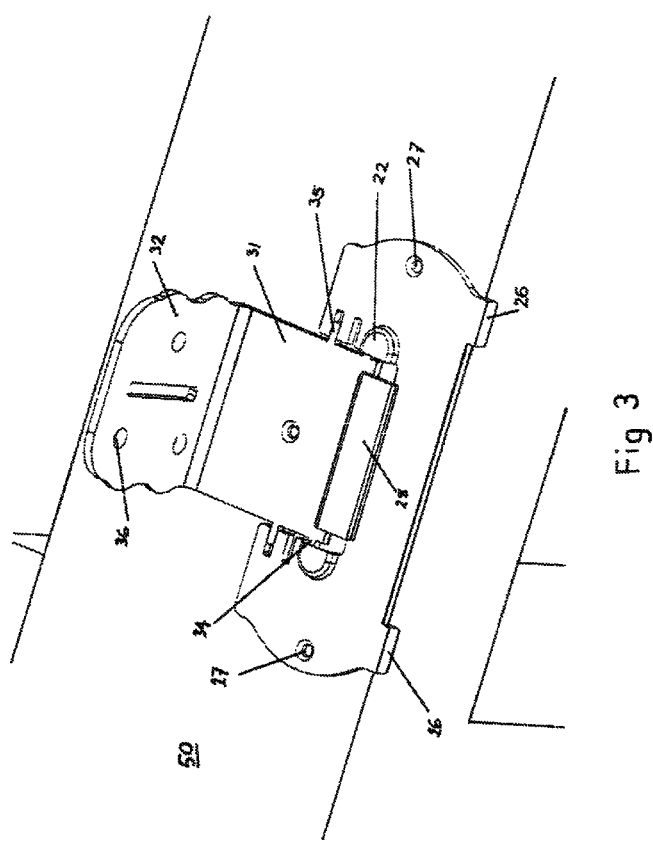

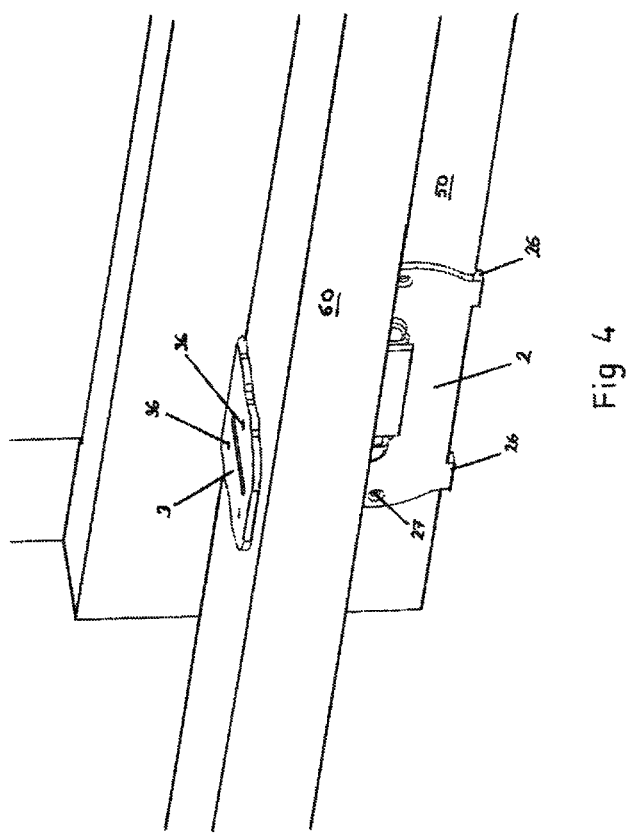

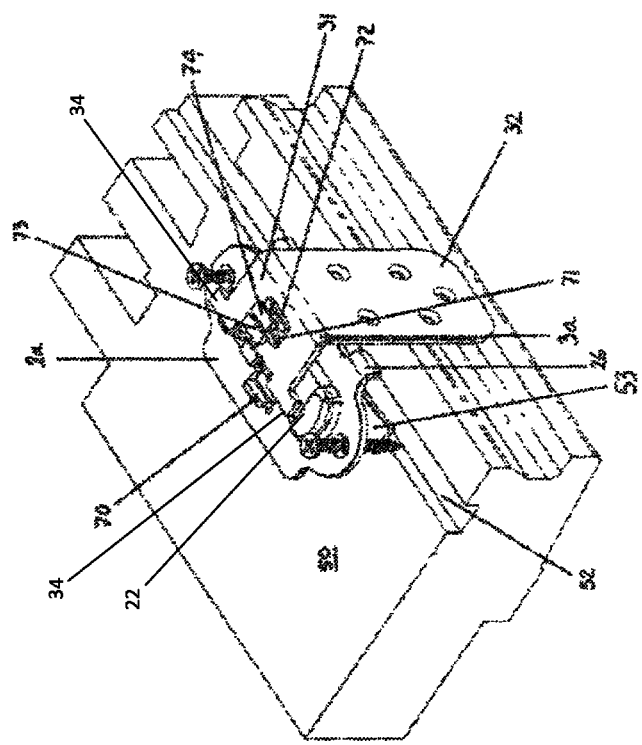

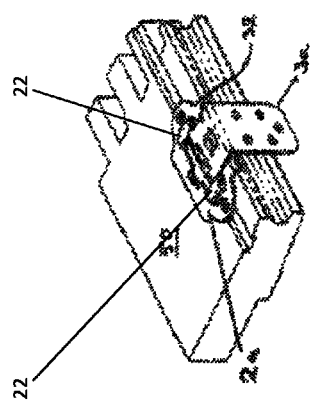
Fig 5b    Fig 5e
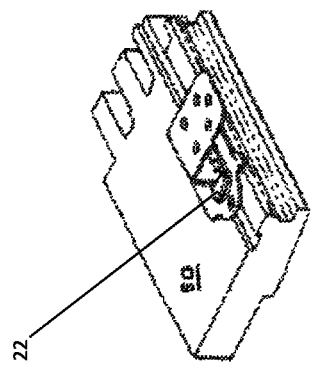
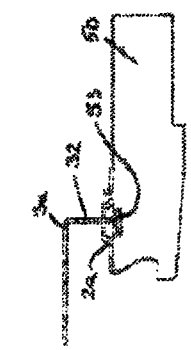
Fig 5c    Fig 5f
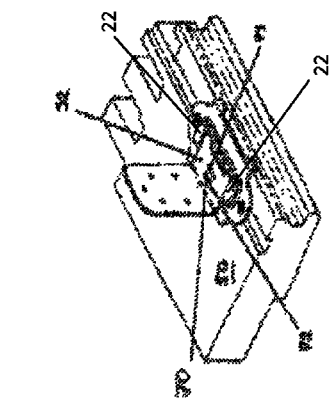
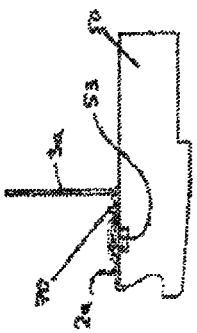
Fig 5d    Fig 5g

MOUNTING BRACKET FOR A WINDOW

CROSS-REFERENCE TO RELATED APPLICATION

The instant application is a national phase of, and claims priority to, PCT International Application No. PCT/GB2010/050759, filed on May 10, 2010, pending, and GB Patent Application Serial No. 0907951.8, filed on May 8, 2009, pending, the entire specifications of both of which are expressly incorporated herein by reference.

The present invention relates to window installations for inclined roofs, in particular to a mounting bracket suitable for mounting such a roof window to a roof.

Roof windows, or skylights, which are fitted to sloping or inclined roof surfaces typically compromise a main frame structure and a openable sash structure, each having top, bottom and side members, the main frame being mountable to the roof structural members and the sash being pivotally mounted to the main frame about an axis of rotation parallel with the respective top and bottom members. During installation care must be taken to ensure that the roof window is mounted to the roof at a correct height above the surrounding roof surface in order to accommodate the particular roof covering used or to be used, the various possible roof covering materials often varying widely in thickness and type.

Presently, fixtures are provided as separate items which must be attached to the window assembly by the persons installing the windows and often there can be confusion as to their correct usage in terms of setting the correct height of the window as well as overall positioning and alignment. As a result correct installation of a roof window can be a time consuming activity that is fraught with potential error and is unsuitable for unskilled workers.

It is therefore an object of the present invention to alleviate the disadvantages associated with the prior art.

Accordingly, the present invention provides a mounting bracket for a roof window comprising frame mountable means, roof mountable means and hinge means for mechanically coupling the roof mountable means and the frame mountable means together so that the roof mountable means is movable between an out of use storage position and an in use mounting position, wherein the location of the pivotal point of the hinge means is movable/adjustable.

Advantageously, the roof mountable means can be moved pivotally relative to the frame mountable means and therefore pivotally relative to the frame when the mounting bracket is mounted on the window frame. This means that the mounting bracket can be stowed substantially within the boundary of the frame during transport and hinged into the mounting position for installation. However, the design of the mounting bracket to facilitate movement of the pivotal point of the hinge means also allows the roof mountable means to be adjustable relative to the frame mountable means and consequently the window frame in a plane substantially parallel to a vertical surface of the window frame in use.

Ideally, the hinge means has guide means and slide means. Advantageously, the guide means and the slide means allows the position of the pivotal point of the hinge means to be easily moved in a controlled manner. This slide means and guide means also helps to ensure the adjustability of the mounting bracket between the out of use storage position and the in use mounting position is intuitive for the person installing the roof window.

Preferably, the location of the slide means is adjustable along the guide means.

Ideally, the mounting bracket has means for releasably fixing the location of the roof mountable means relative to the frame mountable means at one or more in use mounting positions. Advantageously, the releasable fixing means allows the installer to select the appropriate position for the roof mountable means to be fixed relative to the frame mounting means. A number of options are engineered into the mounting bracket based on a number of different types of roof covering materials with a different depth dimension. The off site prefixing of the position of the in use bracket mounting positions means that the installer has no measuring, awkward holding or additional screwing to do in situ on the roof.

Preferably, the guide means comprises a pair of spaced apart mutually opposing slots.

Ideally, the slide means comprises a pair of lugs for slidable engagement in the slots. Advantageously, the lugs and slots provide a simple mechanical engineering solution to allow the pivotal point of the hinge means to be adjusted along a preset track. This allows the roof mountable means to be intuitively adjusted between the out of use storage position and a range of in use mounting positions.

Ideally, the spaced apart slots are formed on the roof mountable means or the frame mountable means. Advantageously, the slots are prefabricated and preferably pressed into either component of the mounting bracket during the manufacturing process.

Preferably, the pair of lugs extend from the roof mountable means or the frame mountable means. Advantageously, the lugs are prefabricated into either component of the mounting bracket during the manufacturing process.

Ideally, the spaced apart slots are rectilinear or curvilinear. Advantageously, the curvilinear slots accommodate the roof mountable means to be stowed in an out of use position on an adjacent frame member of the roof window frame.

Preferably, the guide means comprises a guide pin and the slide means comprises a collar.

Ideally, the releasable fixing means comprises male and female members provided between the roof mountable means and the frame mountable means. Advantageously, the male and female releasable fixing members pre engineered into the mounting bracket accommodate quick and safe locating of the roof mountable means in one of a range of in use mounting positions subject to the specific roofing materials to be used.

Preferably, the releasable fixing means comprises one or more tongues for interaction with one or more grooves.

Ideally, the releasable fixing means comprises visible indicia means where the mounting bracket has two or more in use mounting positions. Advantageously, the roof window installation instructions will advise which visible indicia means corresponds to which roof covering material. Again, the technical advantage achieved is that the fitter installing the roof window does not have to measure the position each bracket should be set at for a particular roof covering material. The installer simply selects one of the prefixed positions as indicated on the installation instructions and clicks the mounting bracket into place.

Preferably, the visible indicia means comprises colour coded plugs formed for insertion into grooves. Advantageously, the installer is required to make a positive decision and action to remove a colour coded plug dependent on the roof covering material being installed on the roof.

Ideally, urging means are provided for urging the roof mountable means into either or both of the out of use storage position and the in use mounting position. Advantageously, the urging means removes the requirement for the roof mountable means to be temporarily fixed onto the frame in the storage position and also removes the requirement for temporary pinning means to hold the roof mountable means in the in use position. The urging means provides the mounting bracket with inbuilt flick fit technology giving the installer reassuring sensory feedback indicating a secure and accurate fitting of the mounting bracket.

Preferably, the urging means is provided by biasing means or magnetic means.

Ideally, the biasing means is a leaf spring acting on a portion of the roof mountable means.

Accordingly, the present invention also provides a roof window with a plurality of mounting brackets as outlined above.

Accordingly, the present invention also provides a mounting bracket for a roof window comprising frame mountable means, roof mountable means and means for mechanically coupling the roof mountable means and the frame mountable means together so that the roof mountable means is movable between an out of use storage position and an in use mounting position and urging means for urging the roof mountable means into either or both of the out of use storage position and the in use mounting position. The advantages of the features highlighted above apply equally to the same features recited below in relation to this aspect of the invention.

Ideally, the mechanical coupling means is a hinge means.

Ideally, the urging means is provided by biasing means or magnetic means.

Preferably, the biasing means is a leaf spring acting on a portion of the roof mountable means.

Ideally, the location of the pivotal point of the hinge means is movable/adjustable.

Preferably, the hinge means has guide means and slide means.

Ideally, the location of the slide means is adjustable along the guide means.

Preferably, the mounting bracket has means for releasably fixing the location of the roof mountable means relative to the frame mountable means at one or more in use mounting positions.

Ideally, the guide means comprises a pair of spaced apart mutually opposing slots and the slide means comprises a pair of lugs for slidable engagement in the slots.

Preferably, the spaced apart slots are formed on the roof mountable means or the frame mountable means.

Ideally, the pair of lugs extend from the roof mountable means or the frame mountable means.

Preferably, the spaced apart slots are rectilinear or curvilinear.

Ideally, the guide means comprises a guide pin and the slide means comprises a collar.

Preferably, the releasable fixing means comprises male and female members provided between the roof mountable means and the frame mountable means.

Ideally, the releasable fixing means comprises one or more tongues for interaction with one or more grooves.

Preferably, the releasable fixing means comprises visible indicia means where the mounting bracket has two or more in use mounting positions.

Ideally, the visible indicia means comprise colour coded plugs formed for insertion into grooves.

A roof window with a plurality of mounting brackets as outlined above in relation to this aspect of the invention.

Conveniently, the roof mountable means is further adapted for attachment to a roof member such as a rafter or a lathe extending between adjacent rafters.

Advantageously, the roof mountable means is removably attachable to the frame mountable means.

Alternatively, the roof mountable means can be attached to the frame mountable means by hooks, catches, claps, screws, bolts or other suitable means.

Ideally, the frame mountable means is at least one mounting plate.

Preferably, the at least one mounting plate has at least one protruding tongue.

Alternatively, the frame mountable means is in the form of any one or more of, or combination of, the following: rail(s); recess(es); insert(s); pre-located or pre-drilled hole(s); pre-located screw(s); pre-located bolt(s); pre-located dowel(s); pre-machined locating slot(s). It should be appreciated that this is not exhaustive and that other suitable means can be used.

Conveniently, the at least one mounting plate is provided with one or more locating tabs.

Ideally, the one or more locating tabs project perpendicularly from one edge of the mounting plate to ensure accurate alignment of said mounting plate along the edge of a window frame member against which the tab or tabs engage.

Preferably, the roof mountable means comprises a substantially L-shaped bracket member having a first leg and a second leg.

Ideally, the first leg is coupled to the hinge means.

Preferably, the first leg has one or more grooves mountable onto the one or more tongues of the mounting plate.

Ideally, the second leg has means for coupling the L-shaped bracket member to the roof.

In a first embodiment, the first leg is adapted to reside substantially within a space defined by a cut-out portion on the mounting plate when the second leg is attached to the roof structure.

Preferably, on opposing side edges of the first leg there are provided opposing first and second pairs of lugs which extend laterally outwardly from said leg.

Conveniently, the first pair of lugs are adapted for slidable and pivotal cooperation with guide members provided on the mounting plate so that the L-shaped bracket can be moved laterally relative said mounting plate and can be pivoted relative said mounting plate.

Conveniently, the guide members provided on the mounting plate also provide the hinge means by which the L-shaped bracket is attached to the mounting plate.

Advantageously, the second pair of lugs function as stops which dwell within pairs of spaced part complementary recesses provided on the mounting plate when a desired mounting position is selected.

Advantageously, the complementary recesses provided on the mounting plate define predetermined first and second detent positions for the L-shaped bracket to observe, each detent position dependent upon the thickness of the type of roof covering the be used e.g. slate or tile, and which in turn determines the height of the window frame with respect to the surrounding roof surface.

Optionally, the mounting plate may be provided with additional complementary recesses so that additional predetermined detent positions for the L-shaped bracket to observe are provided thereby enabling a greater degree of mounting bracket adjustability.

Conveniently, the mounting plate is further provided with an elongate tab which extends at least partially over the cut-out portion of said mounting plate and which contacts the upper surface of the first leg in an overlapping manner when the mounting bracket is in an in-use position.

Advantageously, the tab provides additional rigidity to the mounting bracket and prevents the L-shaped bracket from rotatably moving or flexing relative the mounting plate when the mounting bracket is fastened to a window frame member and a roof member.

Advantageously, the L-shaped bracket can be pivoted backwardly over the mounting plate so that a roof window assembly incorporating the mounting brackets of the invention can be pre-packaged and delivered on-site with said mounting brackets already mounted in position and the L-shaped brackets conveniently stowed away without protruding outwardly from the window assembly.

In a second embodiment of the invention, the mounting plate is mountable over a groove or channel provided on the window frame member, the channel being provided with an urging means such as a spring which is insertable therein and which is engageable with the first leg of the L-shaped bracket when the mounting bracket is mounted to the window frame member. It will of course be appreciated that the groove or channel is one way of providing sufficient space for the urging means to function and is not an essential feature for the mounting bracket with an urging means to function properly.

In the second embodiment of the invention, the spring means is a leaf spring.

Advantageously, the spring bias of the leaf spring acting upon the L-shaped bracket enables said bracket to be movable between, and maintainable at any oone of or any combination of, a stowed position, an intermediate equilibrium position and an in use mounting position.

In the second embodiment of the invention, the mounting plate is provided with a tongue which is engageable with one of a plurality of complementary grooves provided in the first leg of the L-shaped bracket.

Advantageously, the tongue acts as a stop when the bracket is moved into an in use mounting position by dwelling within one of the complementary grooves/recesses provided on the first leg of the L-shaped bracket when a desired mounting bracket position is selected.

Advantageously, the complementary recesses provided on the L-shaped bracket define predetermined first and second detent positions for the bracket to observe, each detent position dependent upon the thickness of type of roof covering to be used e.g. slate of tile, and which in turn determines the height of the window frame with respect to the surrounding roof surface.

Conveniently, in the second embodiment of the invention the bracket is supplied with colour-coded plugs, the plugs being insertable within the respective complementary grooves/recesses and each representing a selectable window height setting in accordance with printed instructions provided with the mounting bracket or on the window frame.

The invention will hereinafter be more particularly described with reference to the accompanying drawings which show, by way of example only, four embodiments of a mounting bracket in accordance with the invention.

In the drawings:

FIG. 3 is a detailed view of the mounting bracket of FIG. 1 shown with the mounting plate in position on a window frame member;

FIG. 4 is a detailed view of the mounting bracket of FIG. 1 shown with the mounting plate in position on a window frame member and the bracket shown in position against a roof member;

Figure 6:
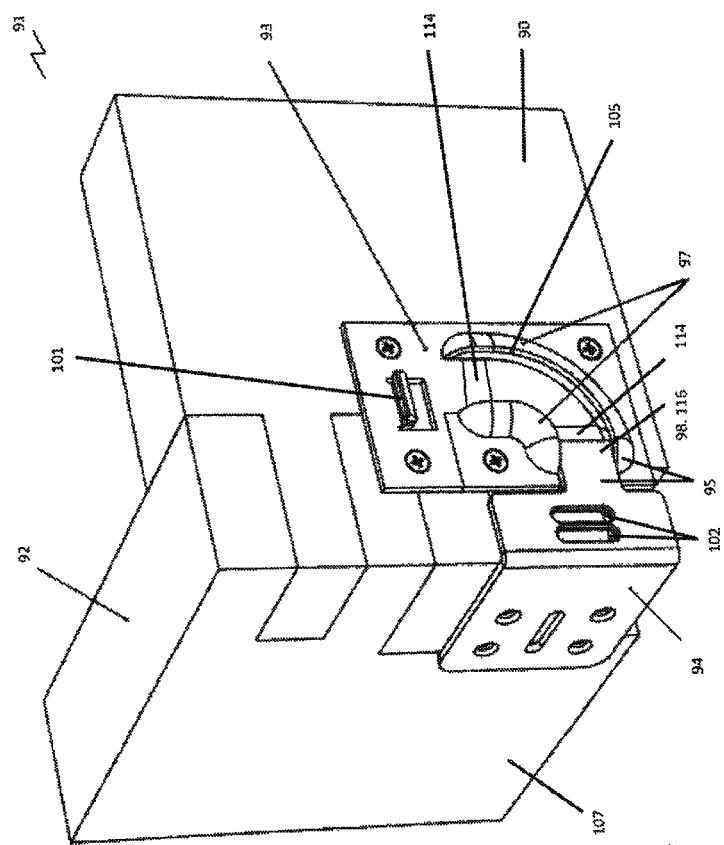
Figure 7:
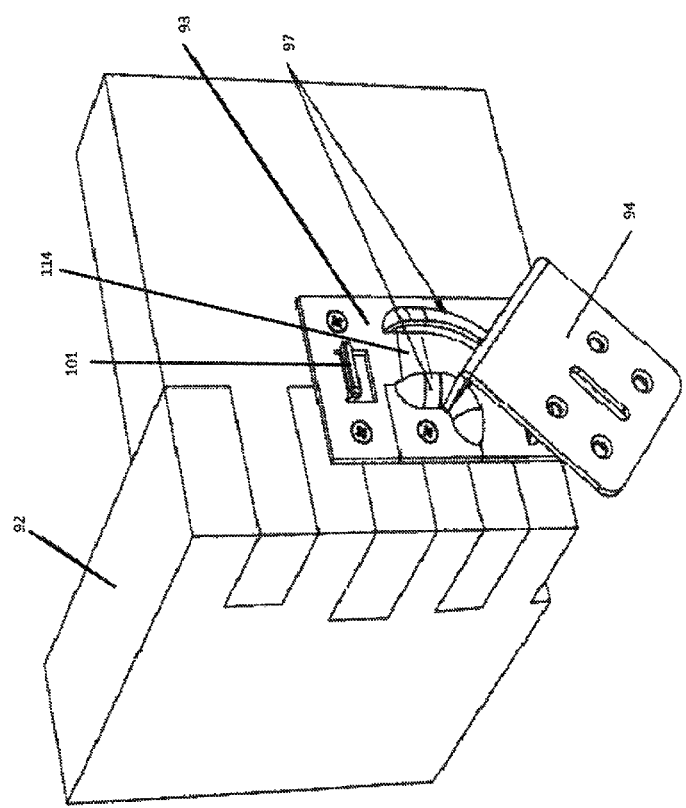
Figure 8:
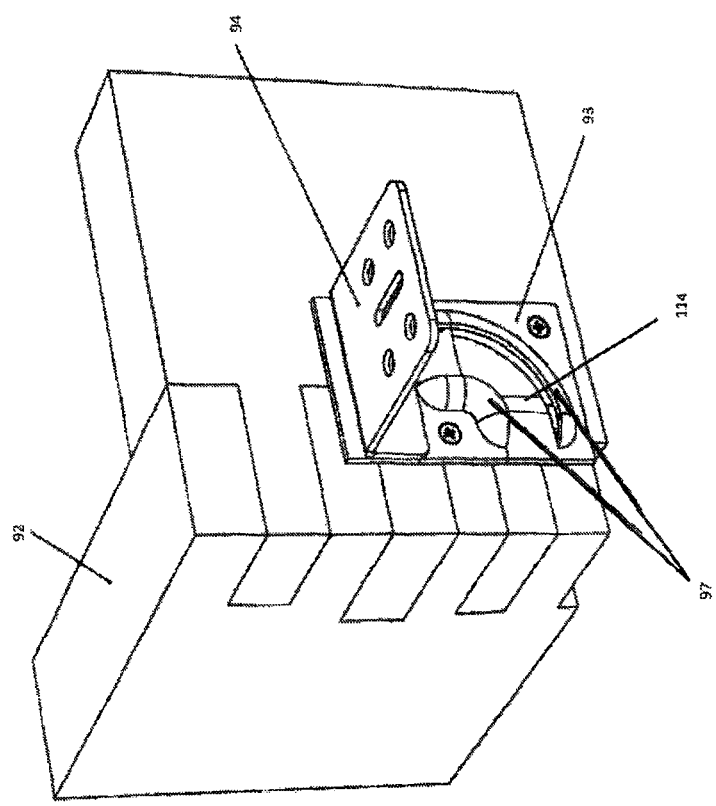
Figure 9:
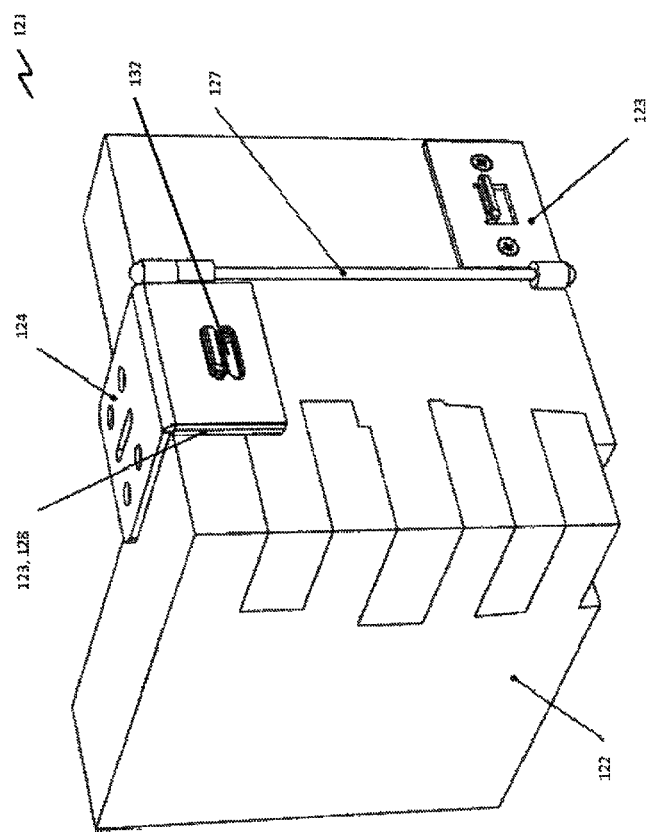
Figure 10:
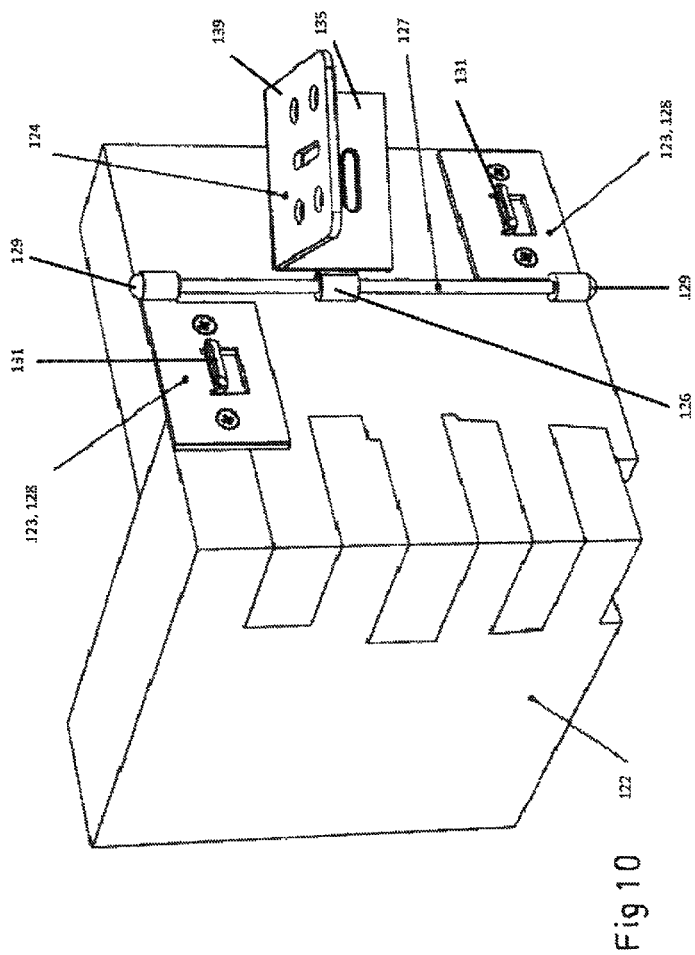
Figure 11:
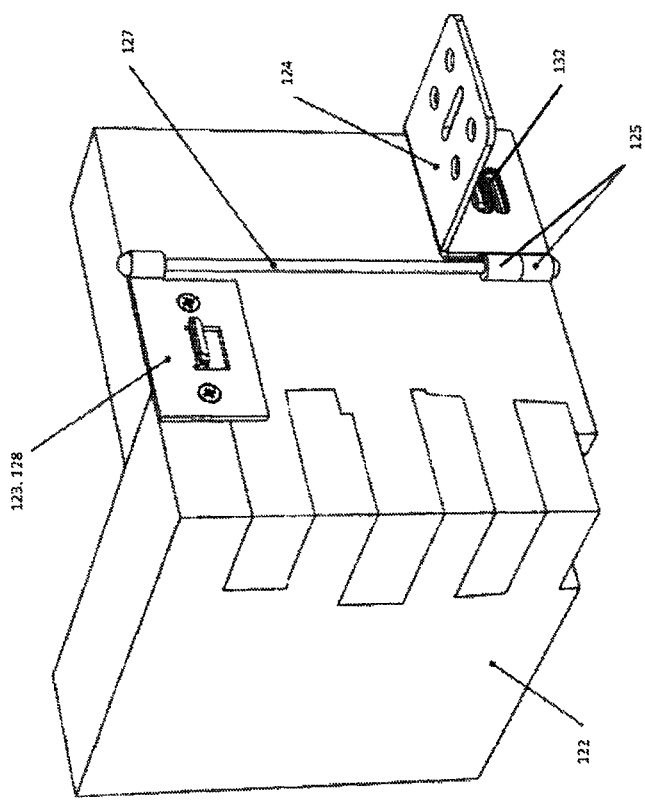

FIG. 5*a* to FIG. 5*d* are schematic illustrations of a second embodiment of the mounting bracket in accordance with the invention;

FIG. 5*e*, FIG. 5*f* and FIG. 5*g* are cross-sectional illustrations of FIGS. 5*b*, 5*c* and 5*d* respectively; and FIG. 6 is a perspective view of a third embodiment of mounting bracket in an out of use storage position;

FIG. 7 is a third perspective view of the third embodiment of mounting bracket in transit between the out of use storage position and the in use mounting position;

FIG. 8 is a perspective view of the third embodiment of mounting bracket in an in use mounting position;

FIG. 9 is a perspective view of a fourth embodiment of mounting bracket in an out of use storage position;

FIG. 10 is a first perspective view of the fourth embodiment of mounting bracket in transit between the out of use storage position and the in use mounting position; and FIG. 11 is a perspective view of the fourth embodiment of mounting bracket in an in use mounting position.

Referring initially to FIG. 1, FIG. 2, FIG. 3 and FIG. 4, there is shown a first embodiment of a mounting bracket indicated generally by the reference numeral 1 for mounting a roof window to a roof, the mounting bracket 1 having a mounting plate 2 and a L-shaped bracket 3, the L-shaped bracket 3 being adapted for hinged attachment to the mounting plate 2. The mounting plate 2 is adapted for attachment to a window frame member 50 (see FIG. 3 and FIG. 4) and the L-shaped bracket 3 is further adapted for attachment to a roof member such as an rafter of a lathe 60 (see FIG. 3) extending between adjacent rafters. Two apertures 27 enable mounting plate 3 to be secured to a window frame member 50 with screws or other suitable fasteners. Two locating tabs 26 project perpendicularly from one edge of the mounting plate 2 to ensure accurate alignment along the edge of the window frame member 50 against which said locating tabs 26 engage as shown in FIG. 3 and FIG. 4.

Figure 1:
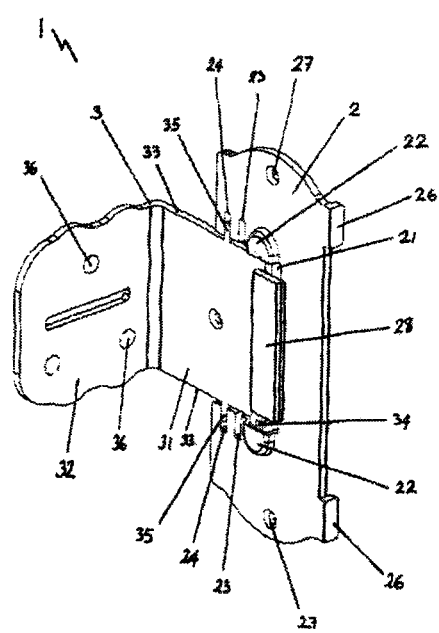
FIG. 1 is a schematic illustration of a first embodiment of a mounting bracket in accordance with the invention.
Figure 2:
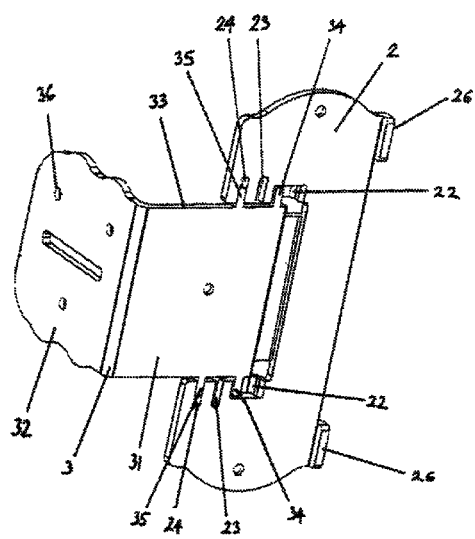
FIG. 2 is schematic illustration of the underside of the mounting bracket of FIG. 1.

The L-shaped bracket 3 has a first leg 31 and a second leg 32, the first leg 31 being adapted to reside substantially within the space defined by a cut-out portion 21 on mounting plate 2 when the second leg 32 is attached to the roof structure 60. The second leg 32 has apertures 36 defined therein for receiving screws or other suitable fasteners which extend through apertures 36 as indicated in FIG. 4 to fix the mounting bracket 1 to the lathe 60. On opposing side edges 33 of first leg 31, there are provided opposing pairs of lugs 34, 35 which extend laterally from said leg. A first pair of lugs 34 are adapted for slidable and pivotal cooperation with guide members 22 provided on mounting plate 2 so that the L-shaped bracket 3 can be moved in a plane substantially parallel to the main plane of the mounting plate 2. The lugs 35 function as stops which dwell within spaced apart pairs of complementary recesses 23, 24 provided on the mounting plate 2 when a desired bracket mounting position is selected. Recesses 23 and 24 define predetermined first and second detent positions for the L-shaped bracket 3 to observe, each position dependent upon the type of roof covering to be used e.g. slate or tile or upon on the thickness of particular roof covering material, which in turn determines the height of the window frame within the roof and with respect to said surrounding roof covering. When L-shaped bracket 3 is moved into a first detent position with lugs 35 in engagement with recesses 24 as shown in FIGS. 1 to 3, the roof window upon which mounting brackets 1 are attached, will sit slightly lower relative to the surrounding roof structure than would be the case when lugs 35 are placed into the second detent position in recesses 23. In this way the mounting bracket 1 is afforded with ready adjustability which removes installer discretion and thereby mitigates against incorrect installation.

Mounting plate 2 is further provided with an elongate tab 28 which extends at least partially over cut-out portion 21 and which contacts the upper surface of leg 31 in an overlapping manner when mounting bracket 1 is in an in-use position as shown in FIGS. 1 to 4. Tab 28 provides additional rigidity to mounting bracket 1 and prevents L-shaped bracket 3 from rotatably moving or flexing relative to the mounting plate 2 when the mounting bracket 1 is fastened to a window frame member and a roof member.

Referring to FIGS. 5a to 5g there is shown a second embodiment of mounting bracket indicated generally by the reference numeral 41 for mounting a roof window to a roof. In the second embodiment of the invention, the mounting plate 2a is mountable over a groove or channel 52 provided on the window frame member 50. The channel 52 is provided with a spring 53 in the form of a leaf spring which is inserted in the channel 52 and which is engaged with the underside of the first leg 31 of the L-shaped bracket 3a when the mounting bracket 41 is mounted to the window frame member as shown in the Figures. Leaf spring 53 is biased so that the spring force acts against L-shaped bracket 3a while said L-shaped bracket 3a is pivoted backwardly over mounting plate 3a as shown in FIG. 6a so that it can be maintained in a stowed position (FIGS. 5b and 5e), an intermediate equilibrium position (FIG. 5c and FIG. 5f) and an in use position (FIG. 5d and FIG. 5g). This enables an installer to simply flick the bracket 3a from the stowed position to the in use position without the requirement of having to remove any separate pinning means which would usually have been used to maintain the L-shaped bracket 3a in the stowed position. The spring also obviates the requirement for additional fastening members to maintain the bracket in the in use position as it is being moved into position by the installer.

In the second embodiment of the invention and as illustrated in FIGS. 5a to 5d, mounting plate 2a is provided with a spur 70 which is engageable with one of two complementary recesses 72, 73 provided in the first leg 32 of the L-shaped bracket 3a. Spur 70 acts as a stop when the L-shaped bracket 3a is moved into an in use position (FIG. 5d) by dwelling within one of the complementary recesses 71, 72 provided on the mounting plate 2a when a desired bracket mounting position is selected. Each complementary recess 71, 72 provided on the L-shaped bracket 3a defines alternative first and second detent positions for the L-shaped bracket 3a to observe in use, each detent position determining a desired height of the window frame with respect to the surrounding roof surface. The desired height is dependent upon the thickness of the type of roof covering to be used e.g. slate or tile.

In the second embodiment of the invention bracket 3a is supplied with two colour-coded plugs 73, 74 each plug being inserted into complementary recesses 71, 72, respectively, and each representing a selectable window height setting in accordance with printed instructions provided with the mounting bracket 41 or on the window frame. For example, when the window is to be used on a roof which will incorporate thin tiles the window should therefore be placed at a lower height within the roof. In this case, in accordance with the instructions, it will be clear to a user that plug 74 having a particular colour should be removed to make recess 72 available to spur 70 as shown in FIG. 5d. Conversely, where the window is to be mounted to a roof which will incorporate thick tiles, it will be clear to a user that plug 73 which has a different colour should be removed to make recess 71 available to spur 70. The chamfered walls of recesses 71 and 72 and the wedged-shaped nature of plugs 73, 74 as shown in FIG. 5a are such that said plugs fit tightly within said recesses 71, 72 cannot be pushed out by spur 70 which ensures that the bracket can only be set to a desired in use position by a user who has followed the installation instructions as described above. The same guide members 22 and lugs 34 are used as in the first embodiment to provide the hinge arrangement.

Beneficially, the use of the of the various embodiments as described above enables reliable fitment of a window to a roof structure with excellent accuracy and reproducibility. In this way, a roof window to which the mounting brackets 1, 41 are attached can be readily accommodated in a roof irrespective of the type of roof covering used or to be used and without the need for excessive skill or judgement on the part of the person or persons installing said window.

Referring to the drawings and now to FIGS. 6 to 8, there is shown a third embodiment of mounting bracket indicated generally by the reference numeral 91. The mounting bracket 91 for a roof window 92 has a frame mountable member 93, a roof mountable member 94 and a hinge arrangement 95 for mechanically coupling the roof mountable member 94 and the frame mountable member 93 together so that the roof mountable member 94 is movable between an out of use storage position see FIG. 6 and an in use mounting position, see FIG. 8. The location of the pivotal axis of the hinge assembly 95 is movable/adjustable.

Advantageously, the roof mountable member 94 can be moved pivotally relative to the frame mountable member 93 and therefore pivotally relative to the roof window frame 92 when the mounting bracket 91 is mounted on the roof window frame 92. This means that the mounting bracket 91 can be stowed substantially within the boundary of the roof window frame 92 during transport and subsequently hinged into the mounting position for installation. However, the design of the mounting bracket 91 to facilitate movement of the pivotal axis of the hinge assembly 95 also allows the roof mountable member 94 to be adjustable relative to the frame mountable member 93 and consequently the roof window frame 92 in a plane substantially parallel to a vertical surface 90 of the roof window frame 92 in use.

The hinge assembly 95 has a guide arrangement 97 and a slide arrangement 98. Advantageously, the guide arrangement 97 and the slide arrangement 98 ensure that the adjustability of the mounting bracket 91 between the out of use storage position and the in use mounting position is intuitive for the person installing the roof window frame 92. The position of the slide arrangement 98 is slidably adjustable along the guide arrangement 97.

The mounting bracket 91 also has a male member 101 and two cooperating female members 102 for releasably fixing the location of the roof mountable member 94 relative to the frame mountable member 93 at two in use mounting positions. It will of course be appreciated that additional in use mounting positions can be added by simply adding additional female members 102. Advantageously, the releasable fixing arrangement 101, 102 allows the installer to select the appropriate position for the roof mountable member 94 to be fixed relative to the frame mounting member 93. A number of predetermined positions are engineered into the mounting bracket 91 based on a number of different types of roof covering materials with a different depth dimension. The off-site prefixing of the position of the in use bracket mounting positions means that the installer has no measuring, awkward holding or additional screwing to do in situ on the roof.

The guide arrangement 97 comprises a pair of spaced apart mutually opposing elongate slots 105 and the slide arrangement 98 comprises a pair of lugs 116 for slidable engagement in the slots 105. Advantageously, the lugs 116 and slots 105 provide a simple mechanical engineering solution to allow the pivotal axis of the hinge assembly 95 to be adjusted along a preset track. This allows the roof mountable member 94 to be adjusted between the out of use storage position and a range of in use mounting positions. The spaced apart slots 105 are formed on the frame mountable member 93. Advantageously, the slots 105 are prefabricated into the mounting bracket 91 during the manufacturing process. The slots 105 are pressed. The pair of lugs 116 extend from the roof mountable member 94. Advantageously, the lugs 116 are also prefabricated into the mounting bracket 91 during the manufacturing process. The spaced apart slots 105 are curvilinear defining a 90 degree bend section along which the lugs 116 extend. The roof mountable member 94 is an L-shaped bracket and in combination with the curvilinear slots 105, these features allow the L-shaped bracket 94 to be stowed in an out of use position on an adjacent frame member 107 to the frame member the mounting plate 93 is mounted on.

The male member 101 in the form of a punched tongue with an upturned lip is provided on the frame mountable member 93 and the female members 102 are provided on a first leg of the L-shaped bracket 94 in the form of two grooves. Advantageously, the male and female releasable fixing members 101, 102 are engineered into the mounting bracket 91 to accommodate quick and safe location of the roof mountable member 94 in one of two in use mounting positions subject to the specific roofing materials to be used. The grooves 102 in the first leg of the L shaped bracket 94 are brought into alignment with the tongue 101 on the frame mounted plate member 93 by their relative positioning on their respective components in combination with the positioning of the guide members 97 and slide members 98.

The grooves 102 are formed for receiving visible indicia members where the mounting bracket 91 has two or more in use mounting positions. Advantageously, the roof window installation instructions will advise which visible indicia member corresponds to which roof covering material. Again, the technical advantage achieved is that the fitter installing the roof window does not have to measure the position each mounting bracket 91 should be set at for a particular roof covering material. The installer simply selects one of the prefixed positions as indicated on the installation instructions and clicks the mounting bracket 91 into place. The visible indicia members are colour coded plugs formed for insertion into the grooves 102. Advantageously, the installer is required to make a positive decision and action to remove a colour coded plug dependent on the roof covering material being installed on the roof.

An urging member 114 is provided for urging the L-shaped bracket 94 into either or both of the out of use storage position and the in use mounting position. Advantageously, the urging member 114 removes the requirement for the L-shaped bracket 94 to be temporarily fixed onto the roof window frame 92 in the storage position and also removes the requirement for temporary pinning fixtures to hold the L-shaped bracket 94 in the in use position. The urging member 114 provides the mounting bracket 91 with inbuilt flick fit technology giving the installer reassuring sensory feedback indicating a secure and accurate fitting of the mounting bracket 91. The urging member 114 is provided by a biasing member such as a spring or a magnet or both.

Referring to the drawings and now to FIGS. 9 to 11, there is shown a fourth embodiment of mounting bracket indicated generally by the reference numeral 121. The mounting bracket 121 for a roof window 122 has a frame mountable member 123, a roof mountable member 124 and a hinge arrangement 125 for mechanically coupling the roof mountable member 124 and the frame mountable member 123 together so that the roof mountable member 124 is movable between an out of use storage position see FIG. 9 and an in use mounting position, see FIG. 11. The location of the pivotal point of the hinge assembly 125 is slidably movable/adjustable along a guide pin 127.

Advantageously, the roof mountable member 124 can be moved pivotally relative to the frame mounted member 123 and therefore pivotally relative to the roof window frame 122 when the mounting bracket 121 is mounted on the roof window frame 122. This means that the mounting bracket 121 can be stowed substantially within the boundary of the roof window frame 122 during transport and subsequently hinged into the mounting position for installation. However, the design of the mounting bracket 121 to facilitate movement of the pivotal point of the hinge assembly 125 also allows the roof mountable member 124 to be adjustable relative to the frame mountable member 123 and consequently the roof window frame 122 in a plane substantially parallel to a vertical surface of the roof window frame 122 in use.

In this embodiment, the hinge assembly 125 has the guide member 127 in the form of a guide pin and the slide member 126 comprises a collar. The frame mountable arrangement has a first plate 128 mechanically fixed to the frame 122 at an upper edge of the frame 122 with a tubular housing 129 for housing one end of the guide pin 127 and a second plate 128 mechanically fixed to the frame 122 at the lower edge of the frame 122 with a second tubular housing 129 for hosing the other end of the guide pin 127. Each plate 128 has a protruding male member 131 with an upturned lip. The roof mountable member 124 is an L-shaped bracket having a first leg 135 with the collar 126 attached along a lateral edge of the first leg 135 to support the main plane of the first leg 135 in a plane substantially parallel to the main plane of the mounting plates 128 in a stored position and a mounting position. The L-shaped bracket has a second leg 139 substantially perpendicular to the first leg 135 pointing towards the centre of the frame 122 in a stored position and pointing away from the frame 122 in a mounting position. Two female members 132 are provided as grooves on the first leg 135 which are alignable with the male members 131 on both mounting plates 128 in the stored position see FIG. 9 and the two mounting positions see FIG. 11.

The features disclosed in the foregoing description or the following drawings, expressed in their specific forms or in terms of a means for performing a disclosed function, or a method or a process of attaining the disclosed result, as appropriate, may separately, or in any combination of such features be utilised for realising the invention in diverse forms thereof as defined in the appended claims.

The invention claimed is:

1. A mounting bracket (1, 41, 91, 121) for a roof window, comprising:
   frame mountable means (2, 2a, 93, 123);
   roof mountable means (3, 3a, 94, 124); and
   hinge means (22, 34, 95, 125); wherein the hinge means mechanically couple the roof mountable means (3, 3a, 94, 124) and the frame mountable means (2, 2a, 93, 123) together so that the roof mountable means (3, 3a, 94, 124) is movable between an out of use storage position and an in use mounting position;
   wherein the hinge means has a pivotal point locatable between the roof mountable means and the frame mountable means, the location of the pivotal point of the hinge means (22, 34, 95, 125) being movable so that the roof mountable means (3, 3a, 94, 124) is adjustable relative to the frame mountable means (2, 2a, 93, 123), the mounting bracket having means for releasably fixing the location of the roof mountable means relative to the frame mountable means at two or more in use mounting positions, the roof mountable means being further adapted for attachment to a roof member such as a rafter or a lathe extending between adjacent rafters.

2. The mounting bracket as claimed in claim 1, wherein the hinge means (22, 34) has guide means (22) and slide means (34).

3. The mounting bracket as claimed in claim 2, wherein the location of the slide means (34) is adjustable along the guide means (22).

4. The mounting bracket as claimed in claim 2, wherein the guide means (22) comprises a pair of spaced apart mutually opposing slots.

5. The mounting bracket as claimed in claim 4, wherein the slide means (34) comprises a pair of lugs (34) for slidable engagement in the slots.

6. The mounting bracket as claimed in claim 4, wherein the spaced apart slots are formed on the roof mountable means (3a) or the frame mountable means (2a).

7. The mounting bracket as claimed in claim 5, wherein the pair of lugs (34) extend from the roof mountable means (3a) or the frame mountable means (2a).

8. The mounting bracket as claimed in claim 5, wherein the spaced apart slots are rectilinear.

9. The mounting bracket (1, 41, 91, 121) as claimed in claim 1, wherein the releasable fixing means comprises male (35, 70, 101, 131) and female members (23, 24, 72, 73, 102, 132) provided between the roof mountable means (3, 3a, 94, 124) and the frame mountable means (2, 2a, 93, 123).

10. The mounting bracket (1, 41, 91, 121) as claimed in claim 1, wherein the releasable fixing means comprises one or more tongues (35, 70, 101, 131) for interaction with one or more grooves (23, 24, 72, 73, 102, 132).

11. The mounting bracket (1, 41, 91, 121) as claimed in claim 1, wherein the releasable fixing means comprises visible indicia means (73, 74) where the mounting bracket (1, 41, 91, 121) has two or more in use mounting positions.

12. The mounting bracket (1, 41, 91, 121) as claimed in claim 11, wherein the visible indicia means (73, 74) comprises colour coded plugs (73, 74) formed for insertion into grooves (71, 72).

13. The mounting bracket (1, 41, 91, 121) as claimed in claim 1, wherein urging means are provided on the mounting bracket (1, 41, 91, 121) for urging the roof mountable means (3, 3a, 94, 124) into either or both of the out of use storage position and the in use mounting position.

14. The mounting bracket (1, 41, 91, 121) as claimed in claim 13, wherein the urging means (53, 114) is provided by biasing means or magnetic means.

15. The mounting bracket (1, 41, 91, 121) as claimed in claim 14, wherein the biasing means is a leaf spring (53, 114) acting on a portion of the roof mountable means (3, 3a, 94, 124).

16. A roof window (50, 92, 122) with a plurality of mounting brackets (1, 41, 91, 121), wherein at least one of the mounting brackets comprises:
  frame mountable means (2, 2a, 93, 123);
  roof mountable means (3, 3a, 94, 124); and
  hinge means (22, 34, 95, 125); wherein the hinge means mechanically couple the roof mountable means (3, 3a, 94, 124) and the frame mountable means (2, 2a, 93, 123) together so that the roof mountable means (3, 3a, 94, 124) is movable between an out of use storage position and an in use mounting position;
  wherein the hinge means has a pivotal point locatable between the roof mountable means and the frame mountable means, the location of the pivotal point of the hinge means (22, 34, 95, 125) is movable so that the roof mountable means (3, 3a, 94, 124) is adjustable relative to the frame mountable means (2, 2a, 93, 123), the at least one mounting bracket having means for releasably fixing the location of the roof mountable means relative to the frame mountable means at two or more in use mounting positions, the roof mountable means being further adapted for attachment to a roof member such as a rafter or a lathe extending between adjacent rafters.

* * * * *